(No Model.)
W. R. FOWLER.
FLY FAN.
No. 491,476. Patented Feb. 7, 1893.
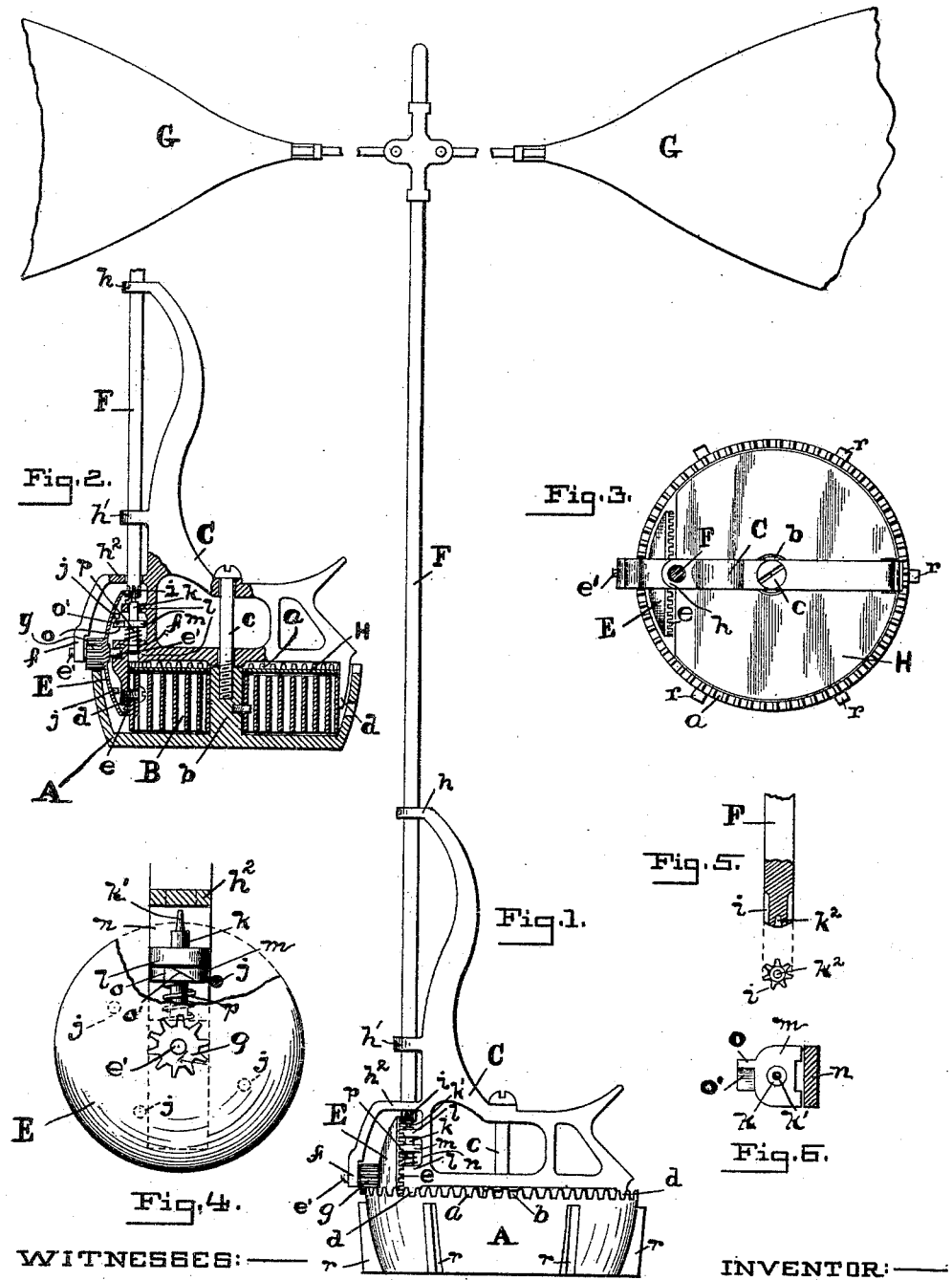
WITNESSES:
A. O. Babendreier
H. Parker Davis.
INVENTOR:
William R. Fowler,
By Chas. B. Mann
atty

United States Patent Office.

WILLIAM R. FOWLER, OF BALTIMORE, MARYLAND, ASSIGNOR TO MATTHAI INGRAM & CO., OF SAME PLACE.

FLY-FAN.

SPECIFICATION forming part of Letters Patent No. 491,476, dated February 7, 1893.

Application filed September 23, 1892. Serial No. 446,683. (No model.)

*To all whom it may concern:*

Be it known that I, WILLIAM R. FOWLER, a citizen of the United States, residing at Baltimore city, in the State of Maryland, have invented certain new and useful Improvements in Fly-Fans, of which the following is a specification.

This invention relates to an improvement in fly-fans and has for its object to provide a fly-fan of simple, compact and cheap construction.

The invention is illustrated in the accompanying drawings, in which,—

Figure 1 shows a side elevation of the complete device; Fig. 2, a sectional view of the base; Fig. 3, a top-view of the base and rotary support; Fig. 4, a view of the outer side of a toothed disk which is shown broken away to disclose a stop-device behind it; Fig. 5, a detail section and end-view of the lower part of the fan-shaft; Fig. 6, a top-view of the stop-device with a portion of the support in section.

The letter, A, designates a base in the shape of a bowl and having a circular rack or toothed track, $a$, which in the present instance is on its upper edge, and a boss, $b$, standing in the center. A pivot-shaft, $c$, rises from said boss, and a support, C, is mounted to rotate on said shaft and extends across the base; it is provided with a spur, $d$, at each end extending downward into the base. A helical spring, B, is contained within said base and is fastened at its inner end to the boss, $b$, and at the outer part to one of the downward-projecting spurs, $d$, on the support, $c$, while the other one of said spurs engages the opposite side of the spring to confine it and prevent friction between it and the walls of the base. A circular concavo-convex disk, E, has a toothed flange, $e$, and journals, $e'$, which are mounted in bearings, $f$, on the support, C, and a pinion, $g$, is fast with said disk, and meshes with the circular rack, $a$. A vertical fan-shaft, F, fits through a bearing, $h$, and also through an upper and a lower guide, $h'$, $h^2$, on the support, C, and has a pinion, $i$, formed on its lower end to mesh with the toothed flange, $e$, of the disk. Two fans, G, are carried in the usual manner at the upper part of the said shaft, F. It will now be seen that the helical spring, B, will rotate the support, C, on the vertical pivot-shaft, $c$, and thereby cause the pinion, $g$, to travel over the circular rack, $a$, and impart motion to the disk, E, which, acting on the pinion, $i$, revolves the fan-shaft, F.

The fan-shaft, F, may be lifted out and entirely removed from the support and it may be raised out of the lower guide $h^2$, when it is desired to stop its revolution, and for this purpose a stop-device is arranged to prevent the helical spring unwinding when the shaft is thus raised.

The disk, E, has a number of studs, $j$, on the inner side, and a vertically sliding pin, $k$, in bearings, $l$, on the support, C, carries a head, $m$, fitting at one side against a flat surface, $n$, of the support to prevent it and the pin from turning, and said head is provided on the opposite side with a stop-block, $o$, beveled as at, $o'$, on the upper side, and normally standing in the path of the studs, $j$, on the disk, E,— being held in such normal position by a spiral spring, $p$, fitting around the pin, $k$, and bearing against the underside of the head, $m$. The slide-pin, $k$, has a reduced upper end, $k'$, and the end of the fan-shaft has a socket, $k^2$, to receive the same, while said shaft rests and turns upon it; thus the pin is a bearing or seat for the shaft, F.

When the fan-shaft is turning its weight together with that of the fan is sufficient to depress the said pin and block against the action of the spring, $p$, and thereby the stop-block, $o$, is lowered out of the path of the studs, $j$, on the disk. The said disk is then free to revolve by the action of the helical spring, B, and thereby the shaft and fans are turned.

When the fan-shaft is removed the pin, $k$, and stop-block are raised again to their normal positions by the spring, and a stud on the disk, E, stops against the block, $o$, and the disk is prevented from turning. When the stop-block, $o$, is raised the friction, caused by a stud, $j$, pressing against the stop-block, will assist the spring to sustain said block and pin and support the weight of the shaft, F, and the fans, and thereby keep them at rest and prevent them from revolving.

To start the fans in motion it is only necessary to depress the shaft, F, so as to release the stop-block, o, from the stud that is pressing against it.

In winding up the spring, B, it is better to first remove the shaft, F, and then the support, C, is taken in one hand and the base, A, in the other, and the latter is turned,—it is provided exteriorly with the ribs, r, to afford a means of readily obtaining a hand-hold on it. In the winding operation the disk of course turns the reverse way, and the projecting studs on the said disk ride over the beveled surface, o', of the stop-block, o, and depress the latter, which thus presents no obstruction to winding.

A plate, H, covers the main-spring and moves with the support, C, the upper end of the boss, b, fitting a hole in said plate and the spurs, d, on the said support, extending down through the same.

It will be seen that the device is simple in construction and hence not likely to get out of order; it occupies little space, and is not expensive.

I am not confined to the special arrangement of gearing herein described, for it is evident that frictional or other style gearing might be substituted, and the arrangement of parts varied.

Having thus described my invention what I claim as new and desire to secure by Letters-Patent is:—

1. In a fly-fan, the combination of a stationary base having a circular track; a rotary support having its axis at the center of said circular track and carrying a pinion which meshes with the latter and a toothed disk fast with said pinion; a motor to rotate the said support; and a fan-shaft having a pinion which meshes with the said toothed disk.

2. In a fly-fan, the combination of a stationary base having a circular track; a rotary support having its axis at the center of said circular track and carrying a wheel arranged to travel over the same and receive motion therefrom; a motor for rotating the support; a stop-device to prevent rotation of said wheel; and a detachable fan-shaft driven through connections with the wheel and holding the said stop out of a position where it obstructs the wheel.

3. In a fly-fan, the combination of a stationary base having a circular track; a rotary support having its axis at the center of said circular track and carrying a pinion which meshes with the latter and a toothed disk fast with said pinion, and having a projection; a motor to rotate the said support; a sliding spring-actuated stop-piece arranged to take position in the path of the projection on the toothed disk; and a detachable fan-shaft arranged to gear with said disk and also engage the sliding stop-piece and hold it out of the path of the disk-projection.

4. In a fly-fan, the combination of a stationary base having a circular track; a rotary support having its axis at the center of said circular track and carrying a pinion which meshes with the latter and a toothed disk fast with said pinion, and having a projection; a motor to rotate the said support; a sliding spring-actuated pin having a head with a beveled stop-block on one side to stand in the path of the projection on the toothed disk; and a detachable fan-shaft fitting at one end over the said slide-pin and holding it down where the stop-block on its head will be out of the path of the projection on the disk,—said fan-shaft arranged to gear with the toothed disk.

5. In a fly-fan, the combination of a hollow base having a circular track; a rotary support extending across said track and having its axis at the center thereof, and spurs at the ends projecting into the base; a helical spring in the base, for driving said rotary support and confined between the spurs thereon; a cover-plate over the base and arranged to rotate with the support; a wheel carried by said support and arranged to travel over the circular track on the base, wherefrom it receives motion; and a fan-shaft driven through connections with said wheel.

In testimony whereof I affix my signature in the presence of two witnesses.

WILLIAM R. FOWLER.

Witnesses:
CHAS. B. MANN,
JNO. T. MADDOX.